(12) United States Patent
Meneghini et al.

(10) Patent No.: US 8,216,444 B2
(45) Date of Patent: Jul. 10, 2012

(54) DEVICE FOR THE SEPARATION OF MERCURY FROM CAUSTIC SODA IN CHLOR-ALKALI PLANTS

(75) Inventors: Giovanni Meneghini, Milan (IT); Raffaello Bertin, Vignole Borbera (IT)

(73) Assignee: Industrie de Nora S.p.A., Milan (IT)

( * ) Notice: Subject to any disclaimer, the term of this patent is extended or adjusted under 35 U.S.C. 154(b) by 934 days.

(21) Appl. No.: 12/249,262

(22) Filed: Oct. 10, 2008

(65) Prior Publication Data

US 2009/0032407 A1    Feb. 5, 2009

(30) Foreign Application Priority Data

Apr. 12, 2006 (IT) .............................. MI2006A0732
Apr. 12, 2007 (WO) ................ PCT/EP2007/053562

(51) Int. Cl.
*C25B 1/42* (2006.01)
*C25B 9/00* (2006.01)

(52) U.S. Cl. .................................... 205/529; 204/247.2

(58) Field of Classification Search .................. 205/529; 204/247.2

See application file for complete search history.

(56) References Cited

U.S. PATENT DOCUMENTS

| 3,091,579 A | * | 5/1963 | Basilevsky ..................... 205/529 |
| 3,630,876 A | | 12/1971 | Hiroshi et al. |
| 3,736,253 A | | 5/1973 | De Angelis et al. |

FOREIGN PATENT DOCUMENTS

GB    1548071 A    7/1979

OTHER PUBLICATIONS

International Search Report for PCT/EP2007/053562 Mailed Nov. 14, 2007.

* cited by examiner

*Primary Examiner* — Arun S Phasge
(74) *Attorney, Agent, or Firm* — Eschweiler & Associates, LLC

(57) ABSTRACT

The invention relates to a device for breaking the electrical continuity of the stream of caustic soda produced in mercury-cathode chlor-alkali plants. The device is comprised of a vessel internally subdivided into three compartments by two flow-conveying septa, the three compartments being in communication and defining a caustic soda tortuous flow-path allowing the centrifugal deposition of mercury microdroplets released by the upstream amalgam decomposer.

15 Claims, 2 Drawing Sheets

DEVICE FOR THE SEPARATION OF MERCURY FROM CAUSTIC SODA IN CHLOR-ALKALI PLANTS

CROSS-REFERENCE TO RELATED APPLICATION

This application is a continuation of PCT/EP2007/053562, filed Apr. 12, 2007, that claims the benefit of the priority date of Italian Patent Application No. MI 2006A000732, filed on Apr. 12, 2006, the contents of which are herein incorporated by reference in their entirety.

BACKGROUND

The production of chlorine by electrolysis of alkali chloride solutions, with particular reference to sodium chloride and potassium chloride (hereinafter "brine") is currently carried out according to three different processes, namely the ion-exchange membrane process, the porous diaphragm process, and the mercury cathode process. The latter type, based on a long-known technology, has experienced a continuous improvement in the cell structure (Ullmann's Encyclopaedia of Industrial Chemistry, VCH, Vol. A6, pag. 416) essentially directed to decreasing the electric energy consumption and to preventing the release of mercury into the environment.

The problem of energy consumption reduction was tackled with success by replacing the original graphite anodes with titanium anodes activated with a particularly effective coating based on platinum group metal oxides. The activated titanium anodes are also characterised by a long operative lifetime, allowing a substantial reduction in the amount of cell shut-downs, which were quite frequent in the case of the corrodible graphite anodes. Since the maintenance shut-downs are critical as regards the release of mercury into the environment, the benefit obtained under this standpoint is apparent.

A further mercury leak reduction was obtained by the routine use of recrystallised salt which permits minimising the quantity of mercury-polluted muds purged from the brine purification section, although involving an additional cost. As a consequence of these provisions it can be nowadays demonstrated that the mercury release from a well-designed and correctly handled plant does not exceed 3 grammes per tonne of product chlorine versus 10 grammes of about ten years ago (Ullmann's Encyclopaedia of Industrial Chemistry, VCH, Vol. A6, page 424).

In currently operating plants, the cathodic caustic product, normally consisting of caustic soda or potash, exiting the amalgam decomposers and containing significant amounts of mercury, graphite powder and hydrogen, is flowed through drippers consisting of perforated plates which cause its fractioning into droplets, with the purpose of breaking the electrical continuity thereby eliminating or at least substantially reducing the stray currents, which consist of parasitic electric current discharging some of the cell voltage to the ground. Stray currents have a negative effect since they lessen the overall electrical efficiency of the process, and more importantly because they determine corrosive attacks which can be very severe.

Since the caustic product contains significant amounts of mercury dragged in the form of microdroplets, the soda or potash discharged from the drippers, prior to being sent to storage, is made to flow through filters containing active carbon, capable of absorbing the mercury present therein and reducing its outlet concentration to very low values, usually compatible with the user specifications. Such treatment, whose results in terms of product final quality are certainly positive, presents the inconvenience of requiring a frequent renovation of the active carbon bed, which is rather quickly saturated with mercury. This operation, inevitably entailing a manual intervention, is hazardous for the health of the operators and produces remarkable quantities of spent carbons that have to be disposed of at high costs.

It would be desirable to overcome the inconveniences associated with the methods of cathodic caustic product treatment currently employed in the presently operating chlor-alkali plants.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, the invention comprises a mercury separating device having a vessel internally subdivided into three compartments and allowing the centrifugal deposition of mercury microdroplets released an upstream amalgam decomposer.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

BRIEF DESCRIPTION OF THE DRAWING FIGURES

For the sake of facilitating the understanding thereof, the invention will be described making reference to the following drawings having a merely exemplifying scope;

DESCRIPTION

Figure 1:
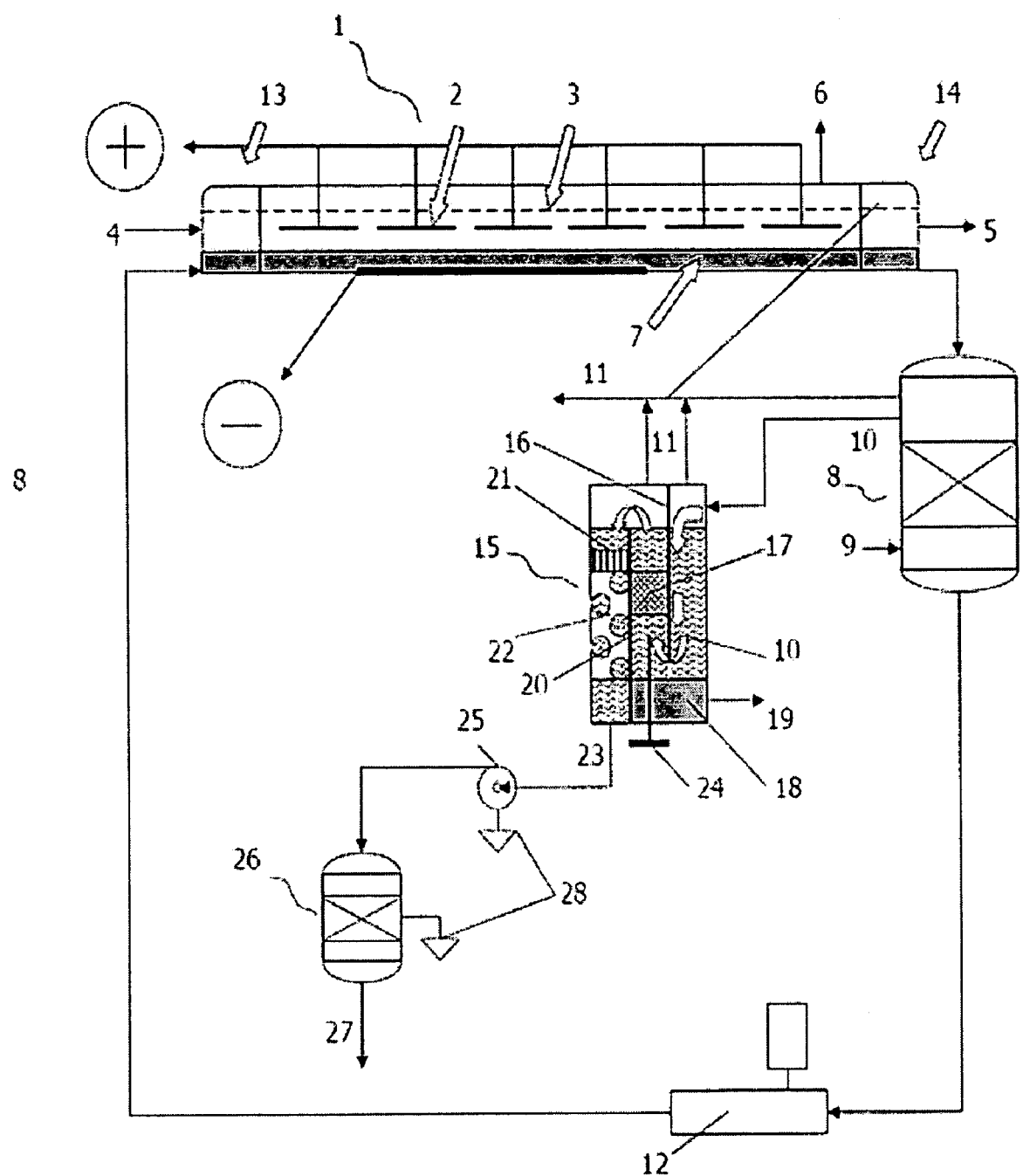
FIG. 1 illustrates a schematic representation of a longitudinal section of a mercury cathode electrolysis cell equipped with the device according to an embodiment of the invention.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

One or more implementations of the invention are hereinafter illustrated and described. However, it will be appreciated by those skilled in the art that the invention is not limited to the exemplary implementations illustrated and described hereinafter.

In the following, reference will be made for the sake of simplicity to a chlorine-caustic soda electrolysis cell, but it is understood that the essential features of the invention apply to a generic mercury cathode chlor-alkali cell.

The mercury separating device according to the invention comprises a dripper of the prior art integrated in an essentially vertical vessel provided with a lower section suitable for carrying out a first separation by centrifugation of mercury present in the caustic product exiting the amalgam decomposer. The centrifugation is obtained by means of vertical conveying septa whose terminal portions form a restricted passage section with sudden variation of the flow direction. The vessel is subdivided by the conveying septa into three communicating compartments disposed to form a tortuous flow-path, of which the one on the caustic product outlet side is equipped with a dripping plate and either the central one or the one on the caustic product inlet side is optionally provided with an internal filter capable of carrying out a second mercury separation.

In one embodiment, the internal filter comprises a bed of active carbon or of metallic fragments optionally consisting of a mercury-wettable metal, for instance iron, carbon steel or nickel.

The lower portion of the central compartment or of the caustic soda inlet side compartment of the vessel is provided with a caustic product density detector comprising a pressure sensor.

FIG. 1 illustrates an electrolysis cell 1 equipped with the required auxiliary components. In particular, 2 identifies the planar anodes connected to the positive pole of a rectifier (not shown), made of titanium provided with a catalytic coating for chlorine evolution based on platinum group metal oxides as known in the art, 3 the level of brine fed at 4 and discharged at 5, 6 the point of withdrawal of the product chlorine, 7 the film of mercury recycled by pump 12, flowing freely on the cell bottom connected to the negative pole of the rectifier, 8 the amalgam decomposer provided with an inlet for water 9 (required for decomposing the amalgam coming from the cell on an internal catalyst bed) and with outlets for the two products, respectively 10 for caustic soda and 11 for hydrogen, 15 the device of the invention, 26 the final filter for absorbing the residual mercury, 27 the flow of purified caustic soda delivered to storage by means of pump 25.

Figure 2:
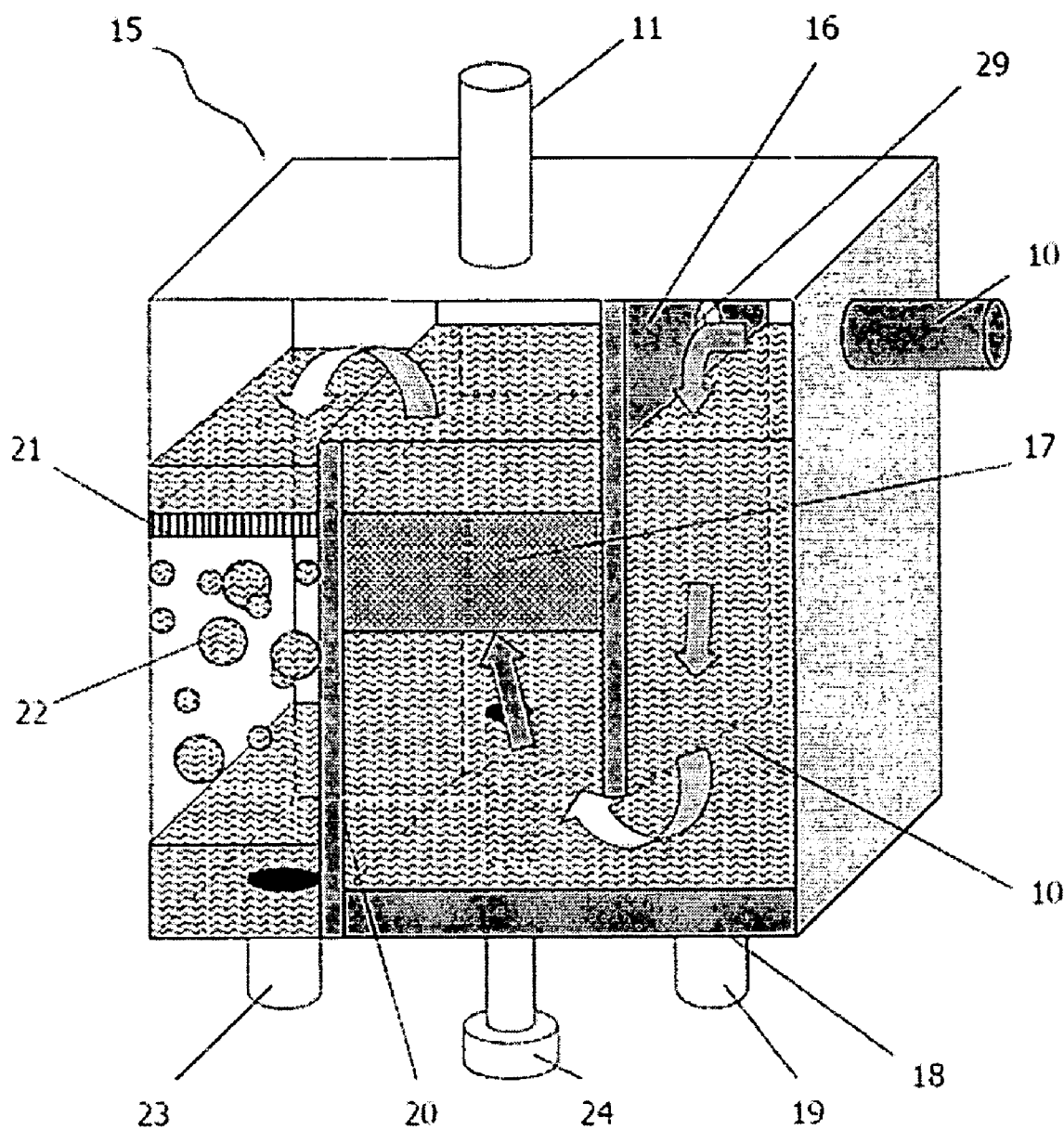
FIG. 2 illustrates a three-dimensional representation of an embodiment of the device according to the invention.

The device 15 is represented in detail in FIG. 2 which shows a three-dimensional view of an embodiment of the vessel as a parallelepiped sectioned by two vertical septa 16 and 20 into three communicating internal compartments disposed to form a tortuous flow-path for the product caustic soda. lin drawing the vessel, a wall has been omitted for better showing of the internal details.

In particular, the caustic soda 10 produced in the amalgam decomposer 8, typically containing 5 to 10 mg/kg (5-10 ppm) of mercury, graphite powder and hydrogen, is fed to the first compartment formed by septum 16 through a nozzle installed in the upper portion of the device 15, as indicated in both of FIGS. 1 and 2.

According to one alternative embodiment (not shown), the nozzle is installed in the lower portion of the first compartment and in this case it is connected with a segment of internal tube whose other extremity is located in correspondence of the upper portion of the compartment. For both feed nozzle embodiments, the most part of hydrogen is separated at any rate in the gas chamber corresponding to the upper portion of the compartment and the caustic soda flows downwards until reaching the lower edge of the septum, whose distance from the level of separated mercury 18 is adjusted so as to delimit a restricted passage section. This brings forth a velocity increase with simultaneous sudden variation in the flow direction (exemplified by the arrows) since caustic soda is forced to flow from the second septum 20 towards the upper portion of the second compartment. The juxtaposition of the velocity increase and the variation in the flow direction associated with the different density of mercury, graphite and caustic soda determines a first significant separation of mercury and graphite powder. The device 15 acts, therefore, in this portion as a static centrifugation device. The tests carried out by the inventors showed that, by virtue of a suitable dimensioning of the device of the invention, the graphite powder is practically completely separated, while the residual content of mercury is reduced to just 0.5-1 ppm. After the separation, the mercury and the graphite powder 18 are then extracted at 19 and sent downstream to the treatment unit. The caustic soda can flow with an upward motion across the second compartment (central compartment comprised between the vertical septa 16 and 20) through an optional internal filter 17 comprising an active carbon bed capable of absorbing mercury, as is known in the art. In such bed, mercury is further reduced to about 0.2-0.3 ppm.

Hence, the quantity of mercury that has to be abated in the final external filter 26 installed downstream is much lower than the typical 5-10 ppm of the plants of the prior art, with the advantageous consequence of a substantially enhanced duration together with a reduction in the amount of active carbon to be eliminated.

Testing has nevertheless shown that the internal filter 17 containing active carbon is characterised by a significant pressure drop, which causes the pressure level of caustic soda supplied to the device to be critical. This situation does not apply to the caustic soda discharge circuit since the external filter 26 is installed downstream of the injection pump 25.

Testing was therefore extended to the search for suitable materials to absorb mercury in beds of low pressure drop as a replacement for active carbon. It was found that beds consisting of mercury-wettable metal fragments are particularly effective. Typical examples include one or more of iron, low carbon steel and nickel. In one embodiment, the bed comprises low carbon steel for the sake of cost.

According to one alternative embodiment, the internal filter may be installed in the first compartment. In this case, an effective coalescence of mercury microdroplets is obtained, with a consequent easier separation thereof by centrifugation in the subsequent lower portion of the compartment, even though the saturation of the filter is faster.

The velocity increase in the restricted passage section formed by septum 16 also starts coalescing the residual hydrogen micro-bubbles which, after the further coalescence action exerted by fitter 17, can be released in the gas chamber corresponding to the upper portion of the compartment.

After crossing the absorption bed, the caustic soda overflows in correspondence of the upper edge of septum 20 and falls to the lower portion of the third compartment (outlet side compartment) fractioned into droplets 22 owing to the perforated plate or dripper 21. The fractioning into droplets is necessary, as mentioned before, in order to break the electrical continuity of the stream of caustic soda. This circuit, in fact, represents the possible path of stray currents to the ground, coinciding with the earthing connection 28 of non electrical appliances of the plant.

The caustic soda 23 exiting the bottom of the third compartment is delivered from pump 25 to active carbon filter 26, where the mercury concentration reaches the final value of about 0.1 ppm, and then to the storage as marketable product 27. Hydrogen separated in the upper portions of the compartments is injected through the ducts of FIG. 1 to the manifold for the main flow of hydrogen 11 coming from the amalgam decomposer.

FIG. 2 shows the extraction of separated hydrogen according to an alternative embodiment, wherein the first septum 16 is provided in its upper part with a pressure-compensating hole 29 putting in communication upper portions of the first and the second compartment. In this way hydrogen 11 separated from the caustic soda may be delivered to the manifold through a single duct.

Tests carried out on a plant allowed to establish the most suitable dimensions for the different sections of the device. In particular, according to an embodiment it is provided that, in order to favour a first mercury separation, the first and second compartment of the device be connected through a separation zone having a passage section not exceeding 50%, and in one embodiment being 5 to 20%, of the passage section of the first compartment. Some typical dimensions are reported hereafter:

- cell capacity: 200 kA
- 50% caustic soda flow-rate at device inlet: 600 kg/h
- height of the device: 800 mm
- section of the device: 500 mm×400 mm
- section of the first compartment (inlet side compartment): 80 mm×400 mm
- restricted passage section from the first to the second compartment: 5 mm×400 mm
- section of the second compartment (central compartment): 100 mm×400 mm
- section of the third compartment (outlet side compartment): 320 mm×400 mm The device 15 is manufactured from electrically insulating materials, comprising optionally reinforced plastic materials comprising one or more of polycyclopentadiene (commercialised for instance by BF Goodrich under the trade-mark Telene®, chlorinated polyvinylchloride (PVCC), polyvinylchloride (PVC), polypropylene and methyl methacrylates (MM), with the use of PVCC, PVC and MM provided the caustic soda is cooled down prior to the injection in the device.

In FIG. 2 the device 15 is shown as a parallelepiped device. Nevertheless, as will be evident to those skilled in the art, other shapes may be employed. For instance, the device may comprise a cylindrical vessel containing two internal pipes acting as septa, the two pipes and the vessel being disposed in a coaxial arrangement. In this case the caustic soda is fed to the inner pipe and discharged from the cylindrical crown delimited by the surfaces of the vessel and of the outer pipe. The innermost cylindrical crown comprised between the walls of the two pipes houses the bed of active carbon or metallic fragments.

In one embodiment, the lower portion of the second compartment (central compartment) of the device of the invention is equipped with a density sensor (24 in FIGS. 1 and 2) comprising a tube having an open upper terminal part in communication with the flow of caustic soda and a pressure sensor, for instance a piezoelectric sensor, allowing the continuous monitoring of the weight of the hydraulic head generated by the volume of caustic soda present in the compartment. A suitable correction of the measured values as a function of temperature and pressure in the upper portion of the compartment allows to precisely determine the density of caustic soda and thus the relevant concentration, and to intervene on the appropriate regulation of the water flow-rate 9 fed to the amalgam decomposer 8.

Although the disclosure has been shown and described with respect to one or more embodiments and/or implementations, equivalent alterations and/or modifications will occur to others skilled in the art based upon a reading and understanding of this specification. The disclosure is intended to include all such modifications and alterations and is limited only by the scope of the following claims. In addition, while a particular feature may have been disclosed with respect to only one of several embodiments and/or implementations, such feature may be combined with one or more other features of the other embodiments and/or implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. A mercury separation device for chlor-alkali plants, comprising a vessel subdivided by two conveying septa into a first caustic product inlet compartment, a second central compartment and a third caustic product outlet compartment, disposed so as to form a tortuous flow-path for the caustic product, the first and the second compartment being connected through a mercury separation zone having a restricted passage section.

2. The device of claim 1, the restricted passage section not exceeding 50% of the passage section of the first compartment.

3. The device of claim 2, the restricted passage section comprising 5 to 20% of the passage section of the first compartment.

4. The device of claim 1, the vessel comprising a parallelepiped.

5. The device of claim 1, the vessel comprising a cylinder and the two septa comprising pipes, the cylinder and the pipes being coaxially arranged.

6. The device of claim 1, wherein the first, the second and the third compartments provided with an upper portion delimiting a gas chamber suitable for hydrogen separation.

7. The device of claim 1, further comprising at least one filter installed in the second compartment or in the first compartment.

8. The device of claim 7, wherein the at least one filter contains active carbon suitable for mercury absorption or contains fragments of mercury wettable metal.

9. The device of claim 8, the mercury wettable metal comprising one or more of iron, low carbon steel or nickel.

10. The device of claim 1, further comprising a density detector installed in the lower portion of the first or of the second compartment.

11. The device of claim 10, the density detector comprising a pressure sensor for measuring the hydraulic head of the caustic product.

12. The device of claim 1, the third compartment comprising a dripper installed in its interior.

13. The device of claim 12, the dripper comprising a perforated plate.

14. The device of claim 1, characterised by being manufactured out of electrically insulating material comprising one or more of polycyclopentadiene, chlorinated polyvinylchloride, polyvinylchloride, polypropylene or methyl methacrylates.

15. A plant for mercury cathode chlor-alkali electrolysis comprising a mercury separation device comprising a vessel subdivided by two conveying septa into a first caustic product inlet compartment, a second central compartment and a third caustic product outlet compartment, disposed so as to form a tortuous flow-path for the caustic product, the first and the second compartment being connected through a mercury separation zone having a restricted passage section.

* * * * *